(12) United States Patent
Ueno et al.

(10) Patent No.: US 9,073,436 B2
(45) Date of Patent: Jul. 7, 2015

(54) POWER CONVERSION SYSTEM FOR HIGH-SPEED RAILWAY VEHICLES AND METHOD OF CONTROLLING POWER CONVERSION SYSTEM FOR HIGH-SPEED RAILWAY VEHICLES

(71) Applicant: Central Japan Railway Company, Aichi (JP)

(72) Inventors: Masayuki Ueno, Aichi (JP); Kenji Sato, Aichi (JP); Hirokazu Kato, Aichi (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 0 days.

(21) Appl. No.: 14/361,029

(22) PCT Filed: Nov. 30, 2012

(86) PCT No.: PCT/JP2012/081171
§ 371 (c)(1),
(2) Date: May 28, 2014

(87) PCT Pub. No.: WO2013/081135
PCT Pub. Date: Jun. 6, 2013

(65) Prior Publication Data
US 2014/0330461 A1 Nov. 6, 2014

(30) Foreign Application Priority Data

Nov. 30, 2011 (JP) ................................. 2011-262328

(51) Int. Cl.
*G06F 7/00* (2006.01)
*B60L 3/00* (2006.01)
(Continued)

(52) U.S. Cl.
CPC . *B60L 3/003* (2013.01); *B60L 9/00* (2013.01); *B61C 17/00* (2013.01); *B60L 1/003* (2013.01);
(Continued)

(58) Field of Classification Search
CPC ............ B60L 2200/26; B60L 15/2045; Y02T 10/7005; Y02T 10/7022; Y02T 10/7033
USPC ............. 701/19; 361/700; 105/35, 49, 50, 61; 180/65.21, 65.31; 318/139, 376
See application file for complete search history.

(56) References Cited

U.S. PATENT DOCUMENTS 5,215,168 A * 6/1993 Guiot et al. ................... 188/71.6
5,504,667 A * 4/1996 Tanaka et al. ................... 363/37
(Continued)

FOREIGN PATENT DOCUMENTS

JP 10-234108 A 9/1998
JP 2000-134701 A 5/2000
(Continued)

OTHER PUBLICATIONS

Yanfeng et al., Temperature Rising by a High-Speed Train Running Through a Long Tunnel, 2008, IEEE, p. 47-50.*
(Continued)

*Primary Examiner* — McDieunel Marc
(74) *Attorney, Agent, or Firm* — Wiggin and Dana LLP; Abraham Kasdan; Gregory S. Rosenblatt

(57) ABSTRACT

A plurality of power conversion apparatuses disposed in a traveling direction of a plurality of vehicles coupled to one another each includes a conversion unit to convert electric power; a heat dissipation unit to dissipate heat that is generated in the conversion unit to a traveling wind; and a control unit to control the electric power to be converted. A control unit in a first power conversion apparatus is disposed forward, in the traveling direction, of a heat dissipation unit in the first power conversion apparatus, and increases or decreases electric power to be converted in a conversion unit of the first power conversion apparatus in accordance with at least one of information of a number of other heat dissipation units dissipating heat to the traveling wind and information of a distance to a forwardly adjacent one of the other heat dissipation units in the traveling direction.

9 Claims, 10 Drawing Sheets

(51) Int. Cl.
  *B60L 9/00*   (2006.01)
  *B61C 17/00*  (2006.01)
  *B60L 1/00*   (2006.01)
  *B60L 9/12*   (2006.01)

(52) U.S. Cl.
  CPC .............. *B60L 9/12* (2013.01); *B60L 2200/26* (2013.01); *B60L 2240/36* (2013.01); *B60L 2240/525* (2013.01); *B60L 2210/10* (2013.01); *B60L 2210/40* (2013.01); *Y02T 10/7241* (2013.01); *Y02T 10/7216* (2013.01)

(56) References Cited

U.S. PATENT DOCUMENTS

| | | | |
|---|---|---|---|
| 6,600,978 B2 | 7/2003 | Nagasu et al. | |
| 6,870,737 B2 * | 3/2005 | Hashimoto et al. | 361/709 |
| 7,137,344 B2 * | 11/2006 | Kumar et al. | 105/35 |
| 7,854,203 B2 * | 12/2010 | Kumar | 105/35 |
| 8,879,259 B2 * | 11/2014 | Suzuki et al. | 361/700 |
| 2002/0121811 A1 * | 9/2002 | Hashimoto et al. | 307/11 |
| 2011/0041723 A1 * | 2/2011 | Kumar | 105/35 |
| 2012/0050993 A1 * | 3/2012 | Suzuki et al. | 361/700 |

FOREIGN PATENT DOCUMENTS

| | | |
|---|---|---|
| JP | 2002-325313 A | 11/2002 |
| JP | 2003-48533 A | 2/2003 |
| JP | 200348533 A | 2/2003 |
| JP | 2004-6901 A | 1/2004 |
| JP | 2006-347309 A | 12/2006 |
| JP | 2009-096318 A | 5/2009 |
| JP | 2009-148080 A | 7/2009 |

OTHER PUBLICATIONS

WIPO, International Search Report, PCT/JP2012/081171, Feb. 19, 2013.

International Preliminary Report on Patentability, PCT/JP2012/081171, mailed Jun. 12, 2014.

* cited by examiner

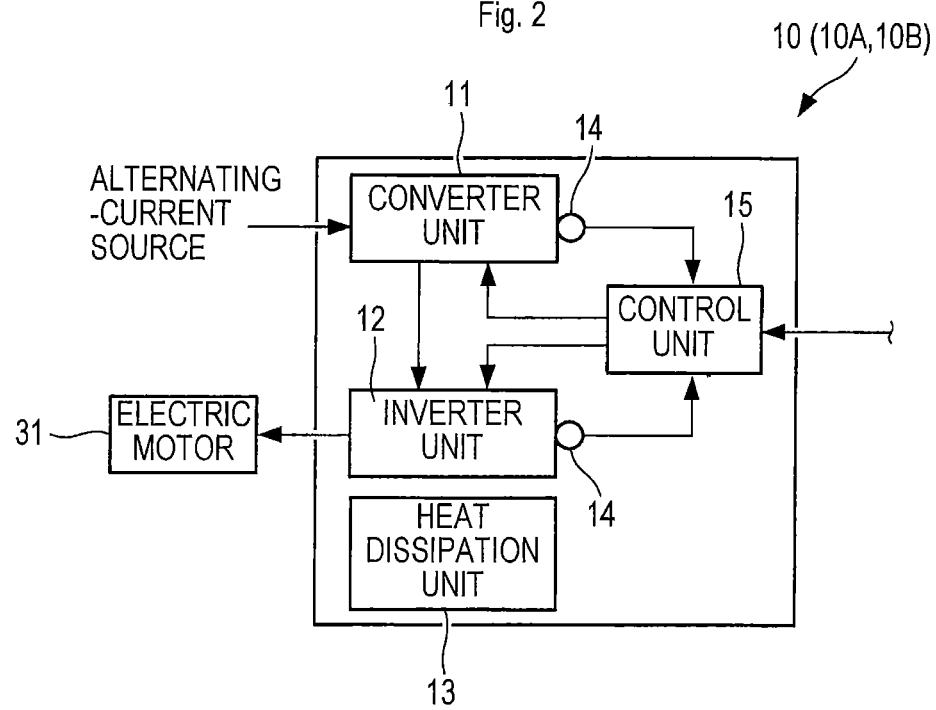

POWER CONVERSION SYSTEM FOR HIGH-SPEED RAILWAY VEHICLES AND METHOD OF CONTROLLING POWER CONVERSION SYSTEM FOR HIGH-SPEED RAILWAY VEHICLES

CROSS-REFERENCE TO RELATED APPLICATIONS

This international application claims the benefit of Japanese Patent Application No. 2011-262328 filed Nov. 30, 2011 in the Japan Patent Office, and the entire disclosure of Japanese Patent Application No. 2011-262328 is incorporated herein by reference.

TECHNICAL FIELD

The present invention relates to a power conversion system for high-speed railway vehicles and to a method of controlling the power conversion system for high-speed railway vehicles.

BACKGROUND ART

A conventional electric train running in an alternating-current electrified section is provided with a power conversion apparatus (hereinafter, referred to as a "main conversion apparatus") including a converter unit to convert an alternating-current to a direct-current, an inverter unit to convert a direct-current to an alternating-current, and other components. The main conversion apparatus is provided with a fan to cool down semiconductor devices employed in the converter unit and the inverter unit.

Recently, due to increased demands for reduction in size and weight also in the technical field of electric trains, downsizing and weight saving of the main conversion apparatus have been sought. Patent Document 1 discloses a technique in which by using wind (hereinafter, referred to as "traveling wind") that flows outside a vehicle during running of an electric train in order to cool down a semiconductor device in the main conversion apparatus, the fan in the main conversion apparatus is abolished to thereby promote downsizing and weight saving of the main conversion apparatus. Specifically, a technique is disclosed in which a main conversion apparatus is mounted under a vehicle floor, and the main conversion apparatus is cooled down by means of traveling wind between tracks and a bottom surface of the vehicle.

RELATED ART DOCUMENTS

Patent Document

Patent Document 1: Japanese Unexamined Patent Application Publication No. 2009-096318

SUMMARY OF THE INVENTION

Problems to be Solved by the Invention

It has become apparent, however, from the results of measurements by the inventors that in a case of the aforementioned main conversion apparatus employing a traveling wind cooling method, a temperature in the main conversion apparatus varies depending on conditions, such as a disposed position of the main conversion apparatus on the vehicle of the electric train, a position of the vehicle in an electric train, etc.

Specifically, traveling wind near the bottom surface of the vehicle has an uneven temperature distribution due to heat discharged from apparatuses, such as the main conversion apparatus, disposed under the floor. It has become apparent that the uneven temperature distribution causes a difference in temperature between a main conversion apparatus cooled by a relatively-low temperature traveling wind and a main conversion apparatus cooled by a relatively-high temperature traveling wind.

For example, in a case where two main conversion apparatuses are disposed forward and rearward of a vehicle in a traveling direction thereof, the main conversion apparatus disposed rearward in the traveling direction tends to have an increased temperature by the influence of exhaust heat of the main conversion apparatus disposed forward. Specifically, it has become apparent that in a case of a vehicle with a main conversion apparatus mounted at each of a front end and a rear end in the traveling direction, a semiconductor device in the main conversion apparatus mounted at the rear end has a higher temperature by several degrees compared with a semiconductor device in the main conversion apparatus mounted at the front end.

Meanwhile, it is known that a semiconductor device has an upper usable temperature limit, and the semiconductor device will be destroyed due to heat beyond the upper temperature limit. To prevent destruction due to heat, it is required to use the semiconductor device at a temperature lower than the aforementioned upper temperature limit. For example, a method providing a protective function is employed in which a temperature in a vicinity of the semiconductor device is monitored and, if the monitored temperature has reached the aforementioned upper temperature limit, it is determined that a failure has occurred in the main conversion apparatus due to a temperature increase and the main conversion apparatus is stopped.

However, according to the aforementioned method of stopping the main conversion apparatus that has reached the upper temperature limit, a number of main conversion apparatuses operating in an entire electric train is reduced. That is, the number of the main conversion apparatuses used for travel of the electric train is reduced, and in other words, an output power to be used for travel of the electric train is reduced, which may lead to reduction in acceleration during acceleration of the electric train.

It has been found through the research by the inventors that the possibility of main conversion apparatus being stopped due to temperature increase as described above is quite limited; in other words, that such thermally harsh condition, is substantially limited. For example, in a case where a condition of daytime with a high outside temperature in high summer and a condition that there is a large number of vehicles with stopped main conversion apparatuses in a train are satisfied, and also a condition that a main conversion apparatus is disposed at a position to be subject to the influence of exhaust heat of an apparatus disposed forward in the traveling direction is satisfied, the main conversion apparatus may be stopped due to an increase in temperature.

Currently, a main conversion apparatus is designed not to be stopped even under the aforementioned conditions under which the main conversion apparatus should be stopped due to an increase in temperature as described above. Specifically, a main conversion apparatus is designed to secure a larger cooling capacity so that the temperature of the main conversion apparatus will not reach the upper temperature limit even under the most thermally harsh conditions possible. In other words, it means that the cooling capacity of the main conversion apparatus is excessive for most of a time period while the electric train travels. This has been a restrictive condition to downsizing and weight saving of a main conversion apparatus.

One aspect of the present invention is to provide a power conversion system for high-speed railway vehicles that achieves downsizing and weight saving while maintaining an output power of an entire power conversion system including a plurality of power conversion apparatuses, and to provide a method of controlling the power conversion system for high-speed railway vehicles.

Means for Solving the Problems

A power conversion system for high-speed railway vehicles in a first aspect of the present invention includes: a plurality of power conversion apparatuses disposed in line in a traveling direction of a plurality of vehicles coupled to one another to convert externally supplied electric power and to supply the converted power to an electric motor, the power conversion apparatuses each including: a conversion unit to convert the externally supplied electric power; a heat dissipation unit disposed on a bottom surface of the vehicle to dissipate heat that is generated in the conversion unit to a traveling wind flowing along the bottom surface; and a control unit to control the electric power to be converted in the conversion unit based on a control signal inputted by an operator of the plurality of vehicles, wherein a first control unit provided in a first power conversion apparatus of the plurality of power conversion apparatuses executes a control of increasing or decreasing electric power to be converted in a first conversion unit provided in the first power conversion apparatus specified based on the control signal, in accordance with at least one of information of a number of other heat dissipation units disposed forward, in the traveling direction, of a first heat dissipation unit provided in the first power conversion apparatus, and information of a distance to a forwardly adjacent one of the other heat dissipation units in the traveling direction.

According to the power conversion system for high-speed railway vehicles in the first aspect of the present invention, as compared with a method of equally controlling electric power to be converted in conversion units in a plurality of power conversion apparatuses, a control is performed to decrease electric power to be converted in a conversion unit in a power conversion apparatus having a relatively large number of other heat dissipation units forwardly disposed in the traveling direction or in a power conversion apparatus having a relatively short distance to a forwardly adjacent other heat dissipation unit in the traveling direction. At the same time, a control is performed to increase electric power to be converted in a conversion unit in a power conversion apparatus having a relatively small number of other heat dissipation units forwardly disposed or in a power conversion apparatus having a relatively long distance to a forwardly adjacent other heat dissipation unit.

In other words, by decreasing electric power to be converted in a power conversion apparatus in which a temperature of a traveling wind introduced into its heat dissipation unit is relatively high, thermal load in such power conversion apparatus is reduced. On the other hand, by increasing electric power to be converted in a power conversion apparatus in which a temperature of a traveling wind introduced into its heat dissipation unit is relatively low, electric power to be converted in the entire power conversion system is maintained.

With such arrangement, as compared with the method of equally controlling electric power to be converted in conversion units in the plurality of power conversion apparatuses, a heat dissipation capacity required to the heat dissipation unit can be lowered, and thus downsizing and weight saving of the heat dissipation unit can be achieved. Also, as compared with a method of controlling electric power to be converted in a conversion unit based on a temperature of the conversion unit, an output power of the entire power conversion system can be maintained and also downsizing and weight saving thereof can be achieved by means of a simple configuration and a simple control.

An increase/decrease ratio of electric power to be converted in each of the power conversion apparatuses is determined considering influences of a relative placement position of the each of the power conversion apparatuses among all of the power conversion apparatuses, a flow of the traveling wind flowing along the bottom surface of the vehicle, and the like. In an example of a process of such determination, a measurement unit to measure the temperature of the conversion unit is mounted to collect temperature data of the conversion unit during running of the vehicle and make a determination based on the collected temperature data such that a thermal load in the each of the power conversion apparatuses is equal.

In the aforementioned first aspect of the invention, it is preferable that the power conversion apparatus further includes a measurement unit to measure a temperature of the conversion unit, wherein when a measurement signal from the measurement unit indicating that a temperature of the first conversion unit has exceeded a predetermined start threshold is inputted, the first control unit decreases electric power to be converted in the first conversion unit, and wherein a second control unit provided in a second power conversion apparatus of the plurality of power conversion apparatus other than the first power conversion apparatus starts a control of increasing electric power to be converted in a second conversion unit provided in the second power conversion apparatus when the temperature of the first conversion unit has exceeded the predetermined start threshold, to thereby compensate for a decreased power in the first conversion unit.

By executing the control, when the temperature of the conversion unit measured by the measurement unit has exceeded the predetermined start threshold, of decreasing electric power to be converted in the first conversion unit whose temperature has exceeded the threshold as well as executing the control of increasing electric power to be converted in the second conversion unit other than the first conversion unit, to thereby compensate for a decreased power in the first conversion unit, it is possible to maintain an output power of the entire power conversion system even if trouble occurs in the first power conversion apparatus, and it is also possible to achieve downsizing and weight saving of the entire power conversion system.

A power conversion system for high-speed railway vehicles in a second aspect of the present invention includes: a plurality of power conversion apparatuses disposed in line in a traveling direction of a plurality of vehicles coupled to one another to convert externally supplied electric power and to supply the converted power to an electric motor, the power conversion apparatuses each including: a conversion unit to convert the externally supplied electric power; a heat dissipation unit disposed on a bottom surface of the vehicle to dissipate heat that is generated in the conversion unit to a traveling wind flowing along the bottom surface; a measurement unit to measure a temperature of the conversion unit; and a control unit to control electric power to be converted in the conversion unit based on a control signal inputted by an operator of the plurality of vehicles, wherein a first control unit provided in a first power conversion apparatus of the plurality of power conversion apparatuses decreases, when a measurement signal from a first measurement unit indicating that a temperature of a first conversion unit provided in the first power conversion apparatus has exceeded a predetermined start threshold is inputted, electric power to be converted in the first conversion unit, and wherein a second control unit provided in a second power conversion apparatus of the plurality of power conversion apparatus other than the first power conversion apparatus starts a control of increasing electric power to be converted in a second conversion unit provided in the second power conversion apparatus when the temperature of the first conversion unit has exceeded the predetermined start threshold, to thereby compensate for a decreased power in the first conversion unit.

According to the power conversion system for high-speed railway vehicles in the second aspect of the present invention, when a temperature of the first conversion unit has exceeded the predetermined start threshold, the control of decreasing electric power to be converted in the first conversion unit to thereby reduce a thermal load in the power conversion apparatus is executed, and also the control of increasing electric power to be converted in the second conversion unit to thereby maintain electric power to be converted in the entire power conversion system is executed.

With such arrangement, as compared with the method of equally controlling electric power to be converted in conversion units in the plurality of power conversion apparatuses, a heat dissipation capacity required to the heat dissipation unit can be lowered, and thus downsizing and weight saving of the heat dissipation unit can be achieved. Also, as compared with a method of fixing an increase/decrease ratio of electric power to be converted in each of the conversion units, it is possible to change a power conversion apparatus subject to decrease in electric power depending on a temperature condition of the conversion unit, and thus is possible to deal with occurrence of a trouble, such as a temperature rise beyond an expected range, in some of the conversion units.

In the aforementioned configuration or the second aspect of the present invention, it is preferable that the first control unit executes a control of decreasing the electric power to be converted in the first conversion unit to a predetermined electric power when the temperature of the first conversion unit exceeds the predetermined start threshold.

By executing the control of decreasing the electric power to be converted in the first conversion unit to the predetermined electric power when the temperature of the first conversion unit exceeds the predetermined start threshold, it is possible to facilitate the control by the first control unit.

In the aforementioned configuration or the second aspect of the present invention, it is preferable that, after the control of decreasing the electric power to be converted in the first conversion unit is started due to the temperature of the first conversion unit exceeding the predetermined start threshold, when a measurement signal from the first measurement unit indicating that the temperature of the first conversion unit has fallen below a predetermined termination threshold, which is lower than the predetermined start threshold, is inputted to the first control unit, the first control unit terminates the control of decreasing the electric power to be converted in the first conversion unit, and when the measurement signal from the first measurement unit indicating that the temperature of the first conversion unit has fallen below the predetermined termination threshold is inputted to the second control unit, the second control unit terminates the control of increasing the electric power to be converted in the second conversion unit.

By terminating the control of decreasing the electric power to be converted in the first conversion unit and terminating the control of increasing the electric power to be converted in the second conversion unit when the temperature of the first conversion unit has fallen below the predetermined termination threshold after the control of decreasing the electric power to be converted in the first conversion unit is started, as described above, it is possible to limit a time period in which a load in the second conversion unit is increased. Thus, it is possible to suppress an excessive temperature rise in the second conversion unit.

A control method of a power conversion system for high-speed railway vehicles in a third aspect of the present invention is a control method of a power conversion system for high-speed railway vehicles including a plurality of power conversion apparatuses disposed in line in a traveling direction of a plurality of vehicles coupled to one another, the power conversion apparatuses each including: a conversion unit to convert externally supplied electric power and supply the converted power to an electric motor; a heat dissipation unit disposed on a bottom surface of the vehicle to dissipate heat that is generated in the conversion unit to a traveling wind flowing along the bottom surface; and a control unit to control the electric power to be converted in the conversion unit based on a control signal inputted by an operator, the method comprising: an information defining step of defining, in the control unit provided in a first power conversion apparatus of the plurality of power conversion apparatuses, at least one of information of a number of other heat dissipation units disposed forward, in the traveling direction, of a first heat dissipation unit provided in the first power conversion apparatus, and information of a distance to a forwardly adjacent one of the other heat dissipation units in the traveling direction; and a signal defining step of defining a signal to increase or decrease electric power to be converted in a first conversion unit provided in the first power conversion apparatus that is specified based on the control signal, in accordance with the information defined in the information defining step.

According to the control method of a power conversion system for high-speed railway vehicles in the third aspect of the present invention, with respect to a power conversion apparatus defined to have a relatively large number of other heat dissipation units disposed forward in the traveling direction, or a power conversion apparatus defined to have a relatively short distance to a forwardly adjacent one of the other heat dissipation units in the traveling direction, in the information defining step, a control of decreasing the electric power to be converted in the conversion unit to thereby reduce a thermal load in such power conversion apparatus is executed. At the same time, with respect to a power conversion apparatus defined to have a relatively small number of other heat dissipation units or a power conversion apparatus defined to have a relatively long distance to a forwardly adjacent one of the other heat dissipation units, a control of increasing the electric power to be converted in the conversion unit to thereby maintain the electric power to be converted in the entire power conversion system is executed.

With such arrangement, as compared with the method of equally controlling electric power to be converted in the conversion units in the plurality of power conversion apparatuses, a heat dissipation capacity required of the heat dissipation unit can be lowered, and thus downsizing and weight saving of the heat dissipation unit can be achieved.

A control method of a power conversion system for high-speed railway vehicles in a fourth aspect of the present invention is a control method of a power conversion system for high-speed railway vehicles including a plurality of power conversion apparatuses disposed in line in a traveling direction of a plurality of vehicles coupled to one another, the power conversion apparatuses each including: a conversion unit to convert externally supplied electric power and supply the power to an electric motor; a heat dissipation unit disposed on a bottom surface of the vehicle to dissipate heat that is generated in the conversion unit to a traveling wind flowing along the bottom surface; a measurement unit to measure a temperature of the conversion unit; and a control unit to control the electric power to be converted in the conversion unit based on a control signal inputted by an operator, the method comprising: a determination step of determining, by a first control unit provided in a first power conversion apparatus of the plurality of power conversion apparatuses, whether a temperature of a first conversion unit provided in the first power conversion apparatus has exceeded a predetermined start threshold; and a control step wherein, when it is determined in the determination step that the temperature of the first conversion unit has exceeded the predetermined start threshold, the first control unit starts a control of decreasing electric power to be converted in the first control unit, and outputs a signal notifying that the temperature of the first conversion unit has exceeded the predetermined start threshold to a second control unit provided in a second power conversion apparatus of the plurality of power conversion apparatuses other than the first power conversion apparatus; and the second control unit starts a control of increasing electric power to be converted in a second conversion unit provided in the second power conversion apparatus, to thereby compensate for a decreased electric power in the first conversion unit.

According to the control method of a power conversion system for high-speed railway vehicles in the fourth aspect of the present invention, when it is determined in the determination step that the temperature of the first conversion unit has exceeded the predetermined start threshold, the control of decreasing the electric power to be converted in the first control unit to thereby reduce a thermal load in the power conversion apparatus is executed, and also the control of increasing the electric power to be converted in the second conversion unit to thereby maintain the electric power to be converted in the entire power conversion system is executed.

With such arrangement, as compared with the method of equally controlling electric power to be converted in the conversion units in the plurality of power conversion apparatuses, a heat dissipation capacity required of the heat dissipation unit can be lowered, and thus downsizing and weight saving of the heat dissipation unit can be achieved. Also, as compared with the method of fixing the increase/decrease ratio of the electric power to be converted in each of the conversion units, it is possible to change a ratio of the electric power to be converted depending on a temperature condition of the conversion unit, and thus is possible to handle occurrence of trouble, such as a temperature rise beyond an expected range, in some of the conversion units.

Effects of the Invention

According to the power conversion system for high-speed railway vehicles in the first aspect and the second aspect of the present invention, and the control method of the power conversion system for high-speed railway vehicles in the third aspect and the fourth aspect of the present invention, the following effect is achieved: by executing the control of decreasing electric power to be converted in a conversion unit in a power conversion apparatus having a relatively large number of other heat dissipation units forwardly disposed in the traveling direction, or in a power conversion apparatus having a relatively short distance to a forwardly adjacent other heat dissipation unit in the traveling direction and also executing a control of increasing electric power to be converted in a conversion unit in a power conversion apparatus having a relatively small number of other heat dissipation units forwardly disposed in the traveling direction, or in a power conversion apparatus having a relatively long distance to a forwardly adjacent one of the other heat dissipation units, it is possible to maintain an output power of the entire power conversion system for high-speed railway vehicles including the plurality of power conversion apparatuses while realizing downsizing and weight saving of the system.

Also, the following effect is achieved: when the temperature of the first conversion unit has exceeded a predetermined start threshold, by executing the control of decreasing the electric power to be converted in the first conversion unit to thereby reduce a thermal load in the power conversion apparatus as well as the control of increasing the electric power to be converted in the second conversion unit to thereby maintain electric power to be converted in the entire power conversion system, it is possible to maintain an output power of the entire power conversion system including the plurality of power conversion apparatuses while realizing downsizing and weight saving of the system.

BRIEF DESCRIPTION OF THE DRAWINGS

FIG. 2 is a block diagram illustrating configuration of a main conversion apparatus in FIG. 1.

Figure 1:
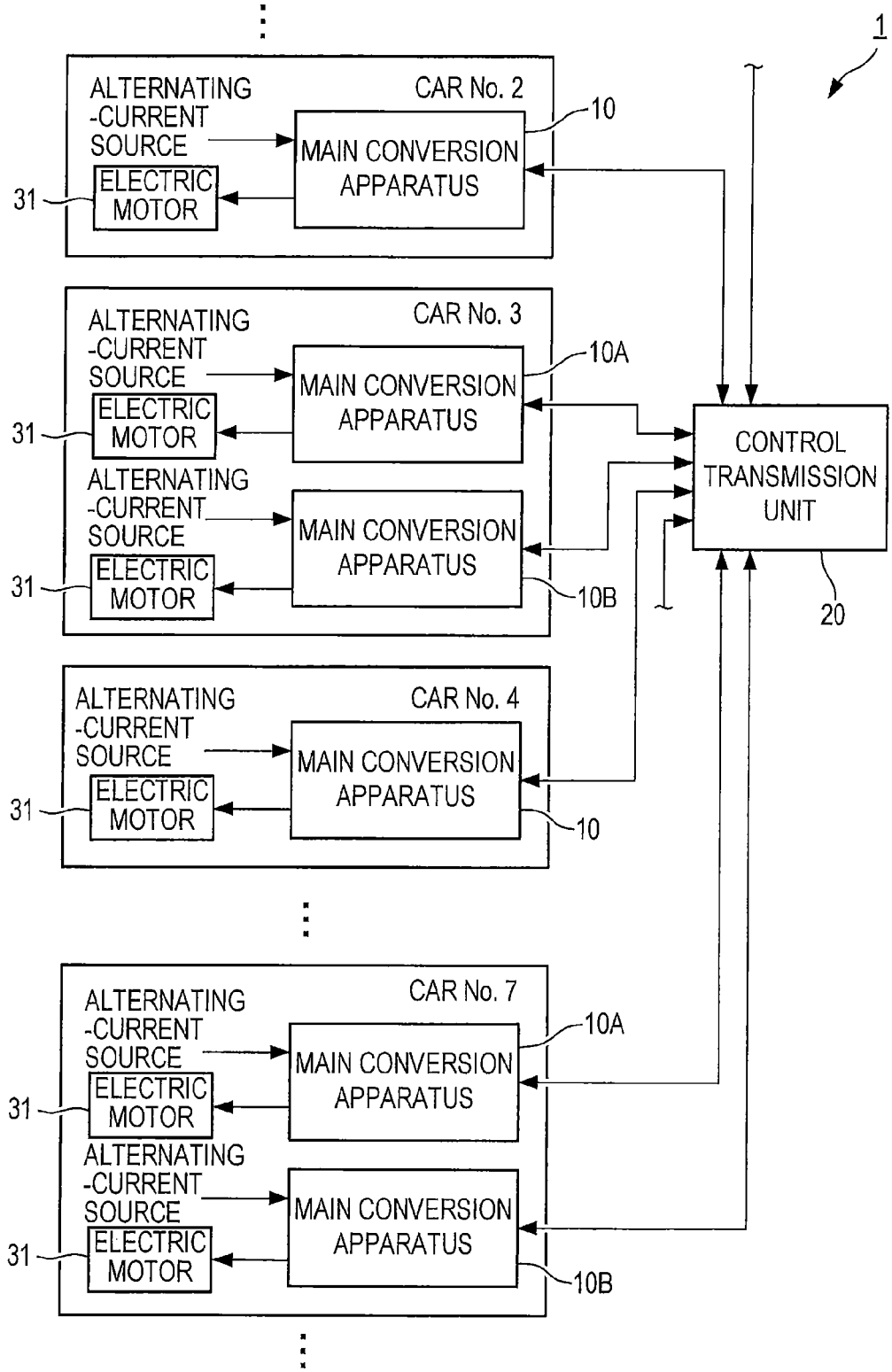
FIG. 1 is a block diagram illustrating a configuration of a power conversion system for high-speed railway vehicles in a first embodiment of the present invention.

EXPLANATION OF REFERENCE NUMERALS 1, 101 . . . power conversion system; 10, 110 . . . main conversion apparatus (power conversion apparatus); 11 . . .

converter unit (conversion unit); 12 ... inverter unit (conversion unit); 13 ... heat dissipation fin unit (heat dissipation unit); 14 ... temperature sensor (measurement unit); 15, 115 ... control unit; 31 ... electric motor; 32 ... bottom surface; T1 ... failure detection temperature (predetermined upper threshold); T2 ... control start temperature (predetermined start threshold); T3 ... control stop temperature (predetermined termination threshold); S12 ... determination step; S14, S23 ... control step

MODE FOR CARRYING OUT THE INVENTION

[First Embodiment]

Hereinafter, a description will be provided of a power conversion system for high-speed railway vehicles (hereinafter referred to as the "power conversion system 1") according to a first embodiment of the present invention, with reference to FIG. 1 to FIG. 6. The power conversion system 1 of the present embodiment is attained by applying the present invention to an example of controlling a plurality of main conversion apparatuses 10 mounted on an electric train consisting of a plurality of vehicles traveling in an alternating-current electrified section. More specifically, the present invention is applied to an electric train in which two main conversion apparatuses 10 are mounted on a single vehicle.

Two main conversion apparatuses 10 may be mounted on each of all the vehicles, or two main conversion apparatuses 10 may be mounted only on part of all the vehicles; there is no limitation to a number of vehicles on which two main conversion apparatuses 10 are mounted. Also, a control according to the present invention may be applied to all of the main conversion apparatuses 10 mounted in the electric train, or may be applied to part of the main conversion apparatuses 10, and there is no limitation regarding this.

As shown in FIG. 1, the power conversion system 1 of the present embodiment mainly includes: a plurality of main conversion apparatuses (an example of a power conversion apparatus) 10 that convert alternating-current power supplied from an external alternating-current source, such as an overhead line, and supply power to an electric motor 31 for rotationally driving wheels of an electric train, and control rotation of the electric motor 31; and a control transmission unit 20 that transmits signals related to control with the plurality of main conversion apparatuses 10.

As shown in FIG. 1, the vehicles of the electric train are coupled side by side to one another in a traveling direction, and are called in sequence as Car No. 1, Car No. 2, ..., Car No. N (N is a natural number) from a vehicle at one end toward a vehicle at the other end. In the present embodiment, an example will be described in which two main conversion apparatuses 10A and 10B are mounted on each of Car No. 3, Car No. 7, Car No. 11, and Car No. 15; and one main conversion apparatus 10 is mounted on each of the remaining vehicles. In case of differentiating between the two main conversion apparatuses 10 mounted on each of Car No. 3, Car No. 7, Car No. 11, and Car No. 15, one disposed forward in the traveling direction is referred to as "main conversion apparatus 10A" and one disposed rearward is referred to as "main conversion apparatus 10B".

As shown in FIG. 2, the main conversion apparatus 10 mainly includes: a converter unit (an example of a conversion unit) 11 to convert an alternating-current voltage supplied from the alternating-current source into a direct-current voltage; an inverter unit (an example of a conversion unit) 12 to convert the direct-current voltage converted by the converter unit 11 into an alternating-current voltage having a desired voltage and a desired frequency; a heat dissipation fin unit (an example of a heat dissipation unit) 13 to externally dissipate heat that is generated in the converter unit 11 and the inverter unit 12; temperature sensors (an example of a measurement unit) 14 to measure temperatures of the converter unit 11 and the inverter unit 12; and a control unit 15 to control the converter unit 11 and the inverter unit 12.

Figure 3A:
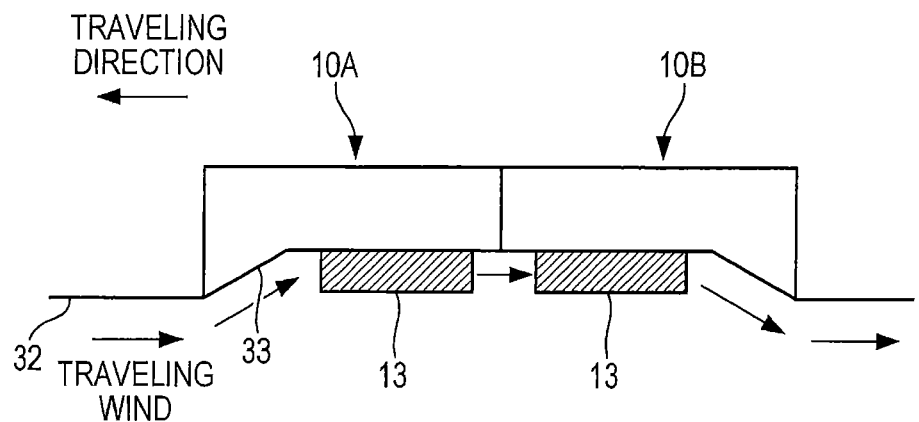
FIG. 3A is a schematic diagram illustrating an arrangement of a heat dissipation fin unit in FIG. 2, the schematic diagram illustrating an arrangement of heat dissipation fin units in a case where two main conversion apparatuses are mounted on a single vehicle.
Figure 3B:
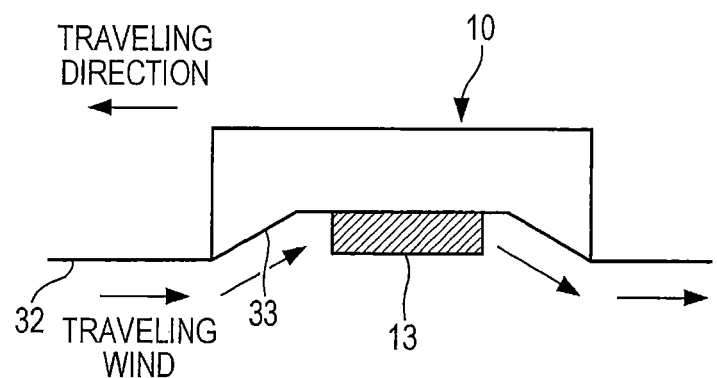
FIG. 3B is a schematic diagram illustrating an arrangement of the heat dissipation fin unit in FIG. 2, the schematic diagram illustrating an arrangement of a heat dissipation fin unit in a case where a single main conversion apparatus is mounted on a single vehicle.

FIG. 3A is a schematic diagram illustrating an arrangement of the heat dissipation fin unit 13 in each of the main conversion apparatus 10A and the main conversion apparatus 10B, and FIG. 3B is a schematic diagram illustrating an arrangement of the heat dissipation fin unit 13 in the main conversion apparatus 10 mounted, for example, on Car No. 2.

The heat dissipation fin unit 13 is designed to dissipate heat that is generated from the semiconductor device and the like during voltage conversion in the converter unit 11 or the inverter unit 12 to a traveling wind flowing along a bottom surface 32 of the vehicle. As shown in FIG. 3A and FIG. 3B, the heat dissipation fin unit 13 is disposed on a most upper planar surface (an example of a bottom surface) in a recessed portion 33 recessed upward in the bottom surface 32 of the vehicle.

Also, the heat dissipation fin unit 13 includes a plurality of plate-like portions made of a metal material having a high thermal conductivity, such as aluminum, these plate-like portions being arranged side-by-side to be parallely spaced. Since the plate-like portions are arranged to extend in the traveling direction of the electric train, the traveling wind flows between the respective parallely arranged plate-like portions.

The heat dissipation fin units 13 of the main conversion apparatus 10A and the main conversion apparatus 10B are arranged, as shown in FIG. 3A, such that the heat dissipation fin unit 13 of the main conversion apparatus 10A and the heat dissipation fin unit 13 of the main conversion apparatus 10B are located in one recessed portion 33 so as to be spaced side-by-side in a forward-rearward direction of the traveling direction. On the other hand, in a case of the heat dissipation fin unit 13 of the single main conversion apparatus 10 mounted on a single vehicle, such as Car No. 2, the single heat dissipation fin unit 13 is located in one recessed portion 33 as shown in FIG. 3B.

The main conversion apparatus 10A and the main conversion apparatus 10B are arranged such that their housings are adjacent or integrated, as shown in FIG. 3A. Also, the converter units 11 of the main conversion apparatus 10A and the main conversion apparatus 10B are arranged separately, and the inverter units 12 of the main conversion apparatus 10A and the main conversion apparatus 10B are arranged separately. In other words, the converter units 11 or the inverter units 12 of the main conversion apparatuses 10A and 10B are not combined.

The temperature sensors 14 are sensors to measure respective temperatures of the converter unit 11 and the inverter unit 12 and include a sensor to measure a temperature of the converter unit 11 and a sensor to measure a temperature of the inverter unit 12 that are provided separately as shown in FIG. 2. The temperature sensors 14 are configured to monitor the temperatures to thereby detect presence/absence of failure or performance degradation in cooling performance in the converter unit 11 and the inverter unit 12. A measurement signal indicating the temperature of the converter unit 11 and a measurement signal indicating the temperature of the inverter unit 12 outputted from the temperature sensors 14 are configured to be inputted to the control unit 15.

Temperature data of the converter unit 11 and the inverter unit 12 measured by the temperature sensors 14 are also used as reference data when selecting a main conversion apparatus 10 to control output power, as described later, other than to monitor failure or performance degradation in cooling performance. In a case of using the temperature data as the reference data, the temperature data is stored in the control unit 15 or the control transmission unit 20.

The control unit 15 is designed to control a voltage and a frequency of an alternating-current voltage converted in the main conversion apparatus 10 and supplied to the electric motor 31 based on a control signal inputted by a train operator. Also, the control unit 15 is designed to perform a control to increase or decrease electric power to be converted in the main conversion apparatus 10 (in other words, an output power of the main conversion apparatus 10) at a predetermined rate from a target output power, depending on a disposed position of the main conversion apparatus 10. Specifically, it is designed to perform a control to increase or decrease the target output power, which is an output power of the main conversion apparatus 10 unequivocally determined based on the control signal to control a speed of the vehicle inputted by the train operator, at a predetermined rate. In other words, it is designed to perform a control to increase or decrease, at a predetermined rate, the target output power that is an average obtained by dividing a total output power of all of the main conversion apparatuses 10 by a number of the main conversion apparatuses 10. A more specific description of the control will be given later.

Any known types of converter and inverter may be employed as the converter unit 11 and the inverter unit 12, respectively, and there is no limitation to the types. Also, any known type of sensor may be employed as the temperature sensor 14, and there is no limitation to the type.

Next, a description will be given of a control method in the power conversion system 1 configured as described above. In the present embodiment, there is described a control method to decrease an output power of, for example, the main conversion apparatus 10B, which is a main conversion apparatus 10 disposed rearward in the traveling direction, among the main conversion apparatus 10A and the main conversion apparatus 10B mounted close to each other on a same vehicle, from the target output power, and to increase an output power of each of the remaining main conversion apparatuses 10 from the target output power.

As shown in FIG. 1, the control transmission unit 20 is connected to all the main conversion apparatuses 10 of the vehicles such that signals, such as a control signal, are mutually transmittable. Also, in the control transmission unit 20, information of a traveling direction of an electric train is defined by a train operator of the electric train or others (an example of an information defining step).

The control transmission unit 20 in which the traveling direction has been defined defines a control signal to decrease an output power from the target output power in a main conversion apparatus 10 disposed rearward in the traveling direction, e.g., the main conversion apparatus 10B in a case where Car No. 1 is a leading vehicle, among the main conversion apparatus 10A and the main conversion apparatus 10B, and defines a control signal to increase an output power in a main conversion apparatus 10 disposed forward in the traveling direction, e.g., the main conversion apparatus 10A. At the same time, a control signal to increase an output power is defined in each of the main conversion apparatuses 10 other than the main conversion apparatuses 10A and the main conversion apparatuses 10B, i.e., the main conversion apparatuses 10 each being singly mounted on one vehicle (an example of a signal defining step). A rate of decreasing the output power and a rate of increasing the output power are previously stored in the control unit 15 or the control transmission unit 20, and are fixed values.

Figure 4:
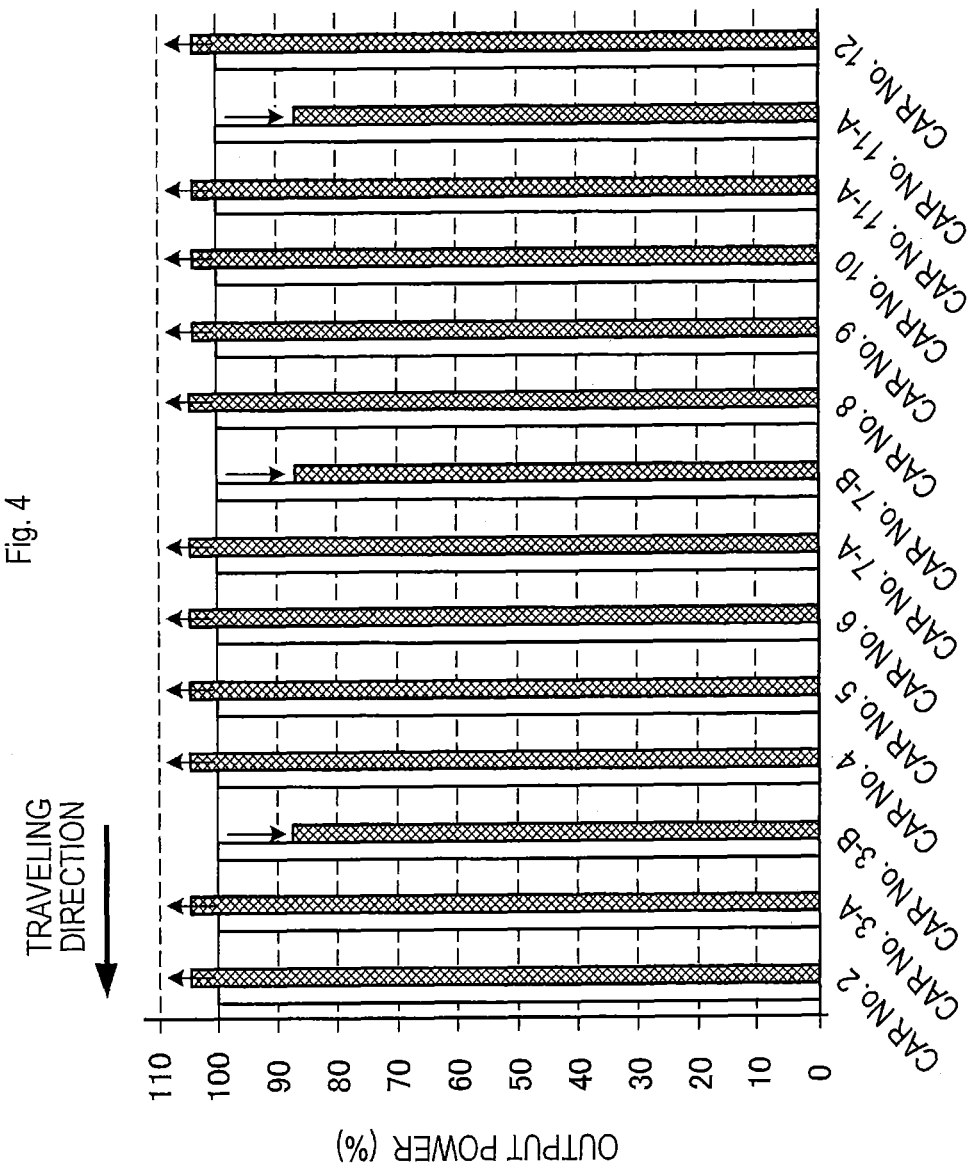
FIG. 4 is a graph illustrating increase/decrease percentages of output powers in the main conversion apparatuses in FIG. 1.

White bars in FIG. 4 show the aforementioned target output power, while hatched bars show output powers after the control according to the present embodiment is performed. Bars with indications of Car No. 2, Car No. 4, Car No. 5, Car No. 6, Car No. 8, Car No. 9, and Car No. 12 show output powers of the main conversion apparatuses 10, and bars with indications of a forward position of Car No. 3 (indicated as "Car No. 3-A"; hereinafter a forward position of each car is similarly indicated by "-A"), Car No. 7-A and Car No. 11-A show output powers of the main conversion apparatuses 10A, and bars with indications of a rearward position of Car No. 3 (indicated as "Car No. 3-B"; hereinafter a rearward position of each car is similarly indicated by "-B"), Car No. 7-B and Car No. 11-B show output powers of the main conversion apparatuses 10B. For simplified description, output powers of only part of the main conversion apparatuses 10 are shown here.

As shown in FIG. 4, in a case where the control according to the present embodiment is not performed, i.e., in a case of the target output power, a control is performed such that all the main conversion apparatuses 10 have a same output power. On the other hand, in a case where the control according to the present embodiment is performed, output powers of the main conversion apparatuses 10B are suppressed to output powers of approximately 87% of the target output power, while output powers of the remaining main conversion apparatuses 10 are increased to output powers of approximately 105% of the target output power. Rates of increase/decrease in output power for the main conversion apparatuses 10, the main conversion apparatuses 10A, and the main conversion apparatuses 10B should not be limited to the aforementioned examples, but are appropriately variable.

Figure 5:
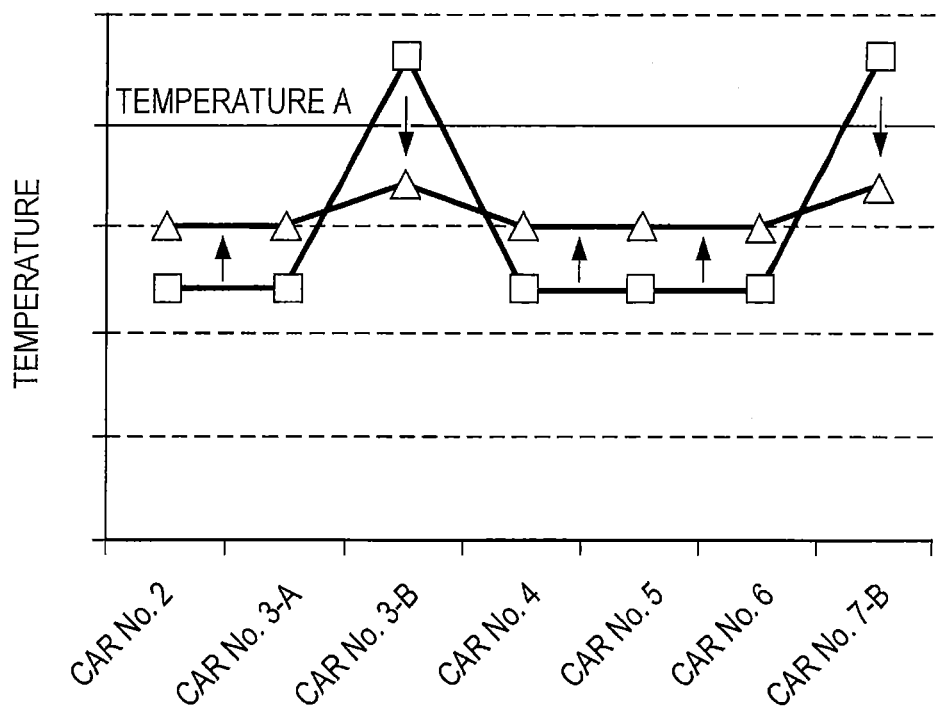
FIG. 5 is a graph illustrating temperatures in the main conversion apparatuses in FIG. 1.

Next, a description will be given of temperatures of the main conversion apparatuses 10 in a case where the control according to the present embodiment is performed and in a case where the control according to the present embodiment is not performed, with reference to FIG. 5. In FIG. 5, the temperatures in the case where the control according to the present embodiment is not performed are indicated by points of square marks, while the temperatures in the case where the control according to the present embodiment is performed are indicated by points of triangular marks. Also, similarly as in FIG. 4, points with indications of Car No. 2, Car No. 4, Car No. 5, and Car No. 6 show output power powers of the main conversion apparatuses 10, a point with the indication of Car No. 3-A shows an output power of the main conversion apparatus 10A, and points with indications of Car No. 3-B and Car No. 7-B show output powers of the main conversion apparatuses 10B. For simplified description, only temperatures of part of the main conversion apparatuses 10 are shown.

In FIG. 5, it is shown that in the case where the control according to the present embodiment is not performed, the temperature of the main conversion apparatus 10B, and more particularly, the temperatures of the inverter unit 12 and the converter unit 11 of the main conversion apparatus 10B exceed a failure detection temperature (represented as Temperature A in FIG. 5). On the other hand, it is shown that in the case where the control according to the present embodiment is performed, the temperature of the main conversion apparatus 10B becomes lower than the failure detection temperature, while the temperature of the remaining main conversion apparatuses 10 becomes higher but remains at a temperature lower than the failure detection temperature.

Although the foregoing description has been made in the case where Car No. 1 is a leading vehicle, the same is applicable even in a case where Car No. 1 is a rearmost vehicle. That is, a similar control is performed except that the control to suppress the output power of the main conversion apparatus 10A is performed and the control to increase the output power of the main conversion apparatus 10B is performed. Therefore, no description of such opposite case will be provided.

According to the power conversion system 1 configured as above, as compared with the method of equally controlling electric power to be converted in the converter units 11 and inverter units 12 of the plurality of main conversion apparatuses 10, a control is performed to decrease electric power to be converted in the converter unit 11 and the inverter unit 12 of the main conversion apparatus 10B that has a relatively small distance to the heat dissipation fin unit 13 of the main conversion apparatus 10A disposed forwardly adjacent in the traveling direction. At the same time, a control is performed to increase electric power to be converted in the converter units 11 and the inverter units 12 of the main conversion apparatus 10A disposed forwardly adjacent in the traveling direction and the main conversion apparatuses 10 disposed at distant positions.

In other words, by decreasing the electric power to be converted in the main conversion apparatus 10B at which a temperature of the traveling wind introduced into the heat dissipation fin unit 13 is relatively high, a thermal load in the main conversion apparatus 10B is reduced. On the other hand, by increasing the electric power to be converted in the main conversion apparatus 10 and the main conversion apparatus 10A at which the temperature of the traveling wind introduced into the heat dissipation fin units 13 is relatively low, electric power to be converted in the entire power conversion system 1 can be maintained.

With such configuration, it is possible to lower a heat dissipation performance required to the heat dissipation fin unit 13, as compared with the method of equally controlling electric power to be converted in the converter units 11 and inverter units 12 of the plurality of main conversion apparatuses 10. Thus, downsizing and weight saving of the heat dissipation fin unit 13 may be achieved. Also, as shown in FIG. 3A, it is possible to dispose the heat dissipation fin units 13 of adjacent main conversion apparatus 10A and main conversion apparatus 10B in the same recessed portion 33.

Moreover, as compared with the method of controlling electric power to be converted in the converter units 11 and inverter units 12 based on temperatures of the converter units 11 and the inverter units 12, downsizing and weight saving of the entire power conversion system 1 can be achieved with a simple configuration and a simple control while maintaining the output power of the entire power conversion system 1.

A rate of increase/decrease in output power of each of the main conversion apparatuses 10 is to be determined considering effects of a relative position of the electric conversion apparatus 10 among all of the main conversion apparatuses 10 and of a flow of the traveling wind flowing along bottom surfaces 32 of the vehicles. As a method of such determination, there may be an exemplary method of collecting temperature data of the converter unit 11 and the inverter unit 12 during traveling of the vehicles by means of temperature sensors 14 attached to the converter units 11 and inverter units 12, and determine a thermal load (in other words, a temperature) at each of the main conversion apparatuses 10 so as to be equal, based on the collected temperature data.

Figure 6:
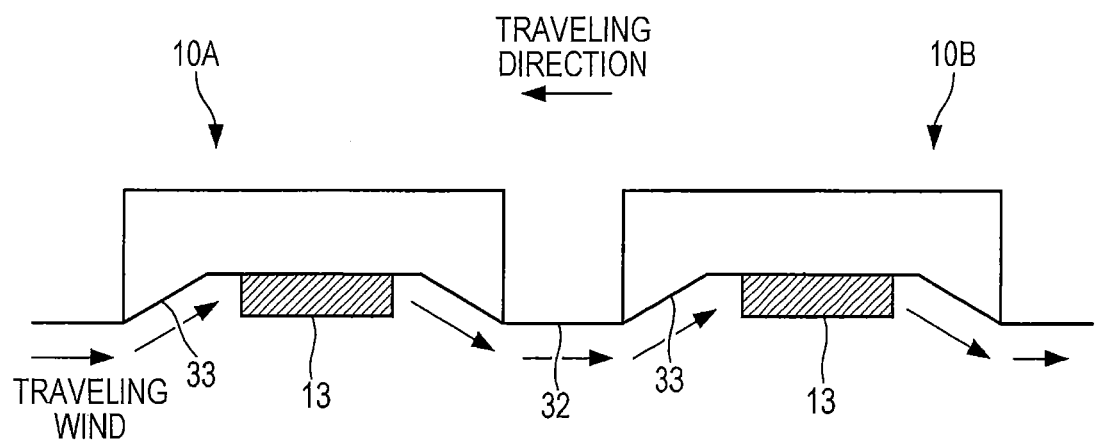
FIG. 6 is a schematic diagram illustrating another arrangement example of heat dissipation fin units.

It is to be noted that the aforementioned embodiment has been described with respect to an example in which the heat dissipation fin units 13 of the main conversion apparatus 10A and the main conversion apparatus 10B are provided in one recessed portion 33, and the heat dissipation fin unit 13 of the main conversion apparatus 10A and the heat dissipation fin unit 13 of the main conversion apparatus 10B may be provided independently in respective recessed portions 33 as shown in FIG. 6.

Also, as shown in the aforementioned embodiment, it may be possible to perform the control of decreasing the output powers of, for example, only the main conversion apparatuses 10B, which are positioned rearward in the traveling direction, among the main conversion apparatuses 10A and the main conversion apparatuses 10B, and to perform the control of increasing output powers of the remaining main conversion apparatuses 10 and 10A. Alternatively, it may be possible to perform the control of decreasing the output powers of the main conversion apparatuses 10, 10A and 10B mounted on vehicles rearward in the traveling direction of the electric train, while performing the control of increasing the output powers of the main conversion apparatuses 10, 10A and 10B mounted on vehicles forward in the traveling direction. There is no particular limitation regarding this.

[Second Embodiment]

Figure 7:
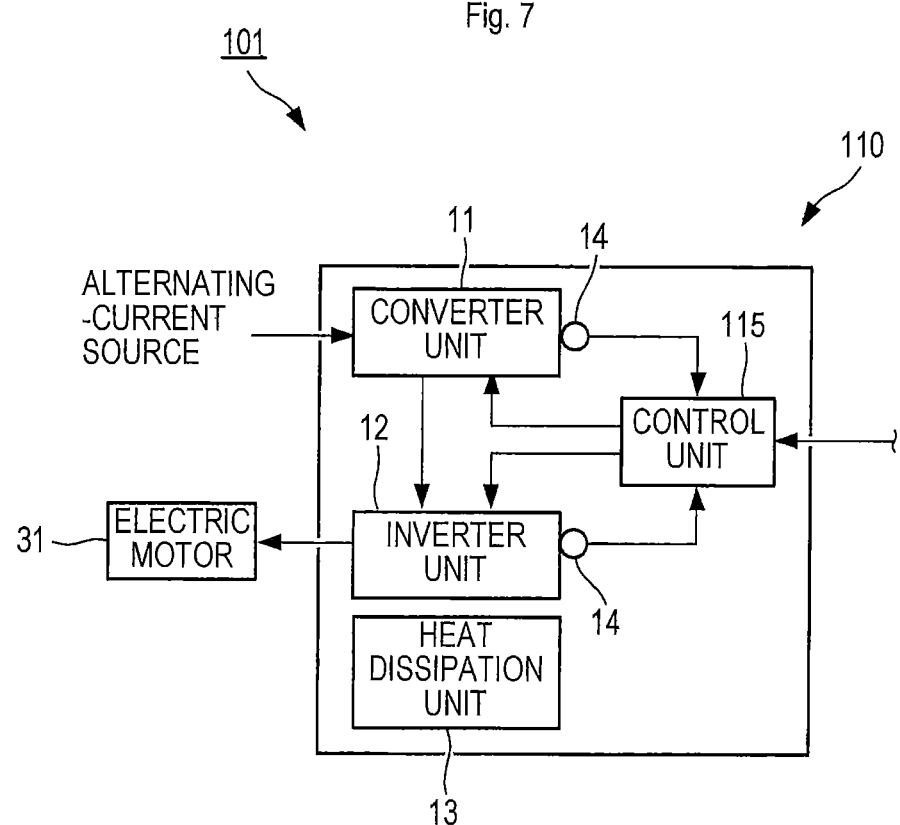
FIG. 7 is a block diagram illustrating a configuration of a main conversion apparatus in a power conversion system for high-speed railway vehicles in a second embodiment of the present invention.

Next, a description will be given of a power conversion system according to a second embodiment of the present invention with reference to FIG. 7 to FIG. 11. Although a basic configuration of the power conversion system in the present embodiment is the same as that in the first embodiment, an output power control method of the main conversion apparatus is different from that in the first embodiment. Accordingly, the present embodiment will be described only with respect to the output power control method of the main conversion apparatus by means of FIG. 7 to FIG. 11, and descriptions of other configurations, etc. will not be given. FIG. 7 is a block diagram illustrating a configuration of a main conversion apparatus 110 in a power conversion system 101 of the present embodiment.

The main conversion apparatus (an example of a power conversion apparatus) 110 of the power conversion system for high-speed railway vehicles 101 (hereinafter referred to as the "power conversion system 101") of the present embodiment is provided mainly with a converter unit 11, an inverter unit 12, a heat dissipation fin unit 13, temperature sensors 14, and a control unit 115 as shown in FIG. 7. For simplified description, a description will be given by applying the present embodiment to an example in which a single main conversion apparatus 110 is mounted on each of all vehicles of an electric train. This is not intended to exclude a case where two main conversion apparatuses 110 are mounted on one vehicle in a similar manner as in the first embodiment.

The control unit 115 is configured to control a voltage and a frequency of an alternating-current voltage converted in the main conversion apparatus 110 and supplied to the electric motor 31 based on a control signal inputted by a train operator, in a similar manner as the control unit 15 in the first embodiment. On the other hand, the control unit 115 of the present embodiment is different from the control unit 15 of the first embodiment in that a control is performed to increase or decrease a power output from a target power output at a predetermined rate in accordance with a measurement signal outputted from the temperature sensor 14 or with a temperature increase signal inputted from another control unit 115 through a control transmission unit 20. A more specific description of such control will be given later.

Next, a description will be given of a control method in the power conversion system 101 having the aforementioned configuration with reference to FIG. 8 to FIG. 11.

Here, a description will be given by applying the method to an example in which at least one of the temperatures of the converter unit 11 and the inverter unit 12 measured by the temperature sensors 14 of the main conversion apparatus 110 mounted on Car No. 7 of an electric train exceeds a control start temperature (an example of a predetermined start threshold) T2. The control start temperature T2 is a temperature lower than a failure detection temperature (an example of a predetermined upper threshold) T1, a temperature increase to or beyond which is considered to cause a failure due to heat in semiconductor devices employed in the converter unit 11 and the inverter unit 12.

Figure 8:
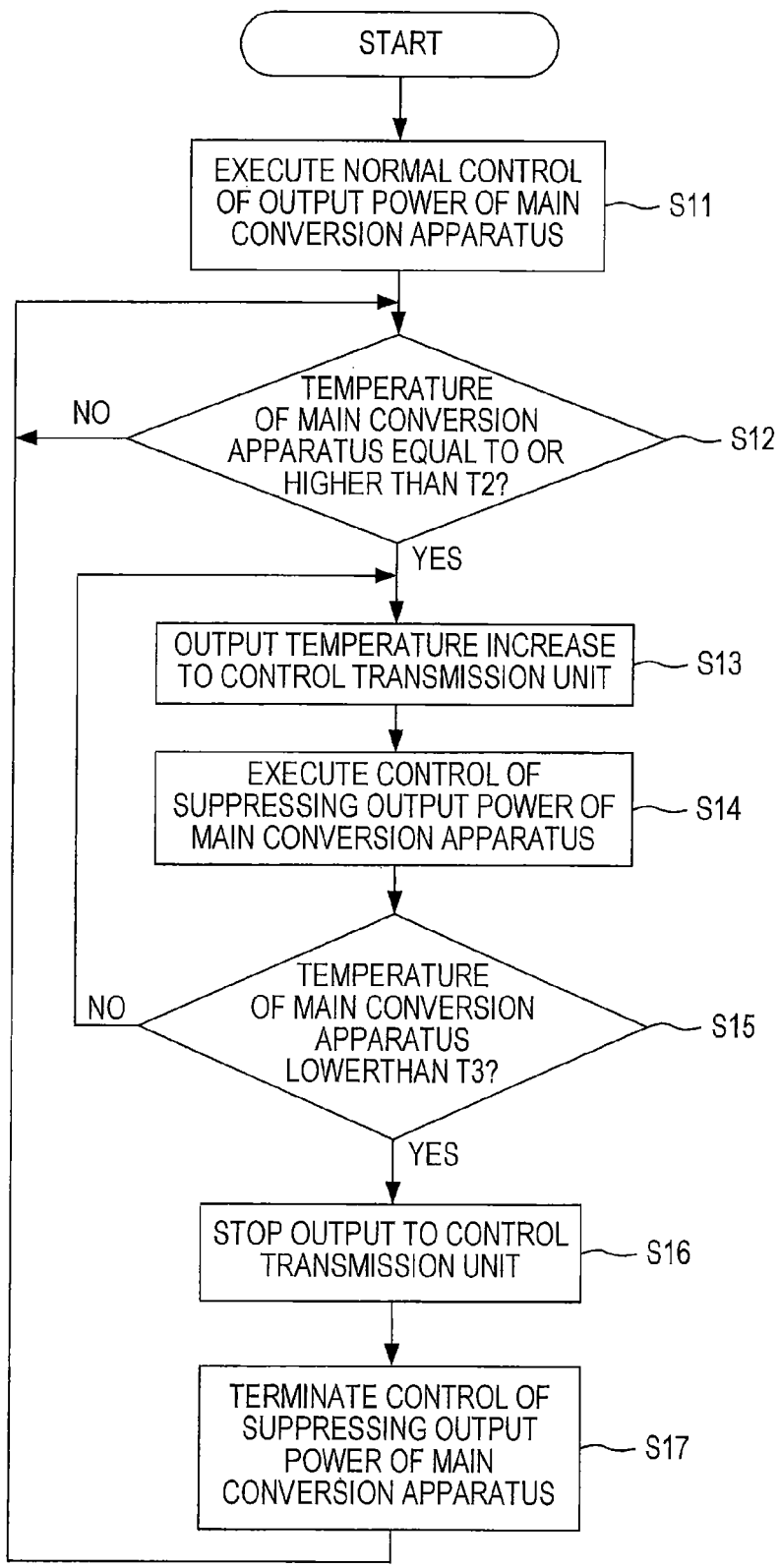
FIG. 8 is a flowchart illustrating a control in a control unit in a main conversion apparatus having an increased temperature.
Figure 9:
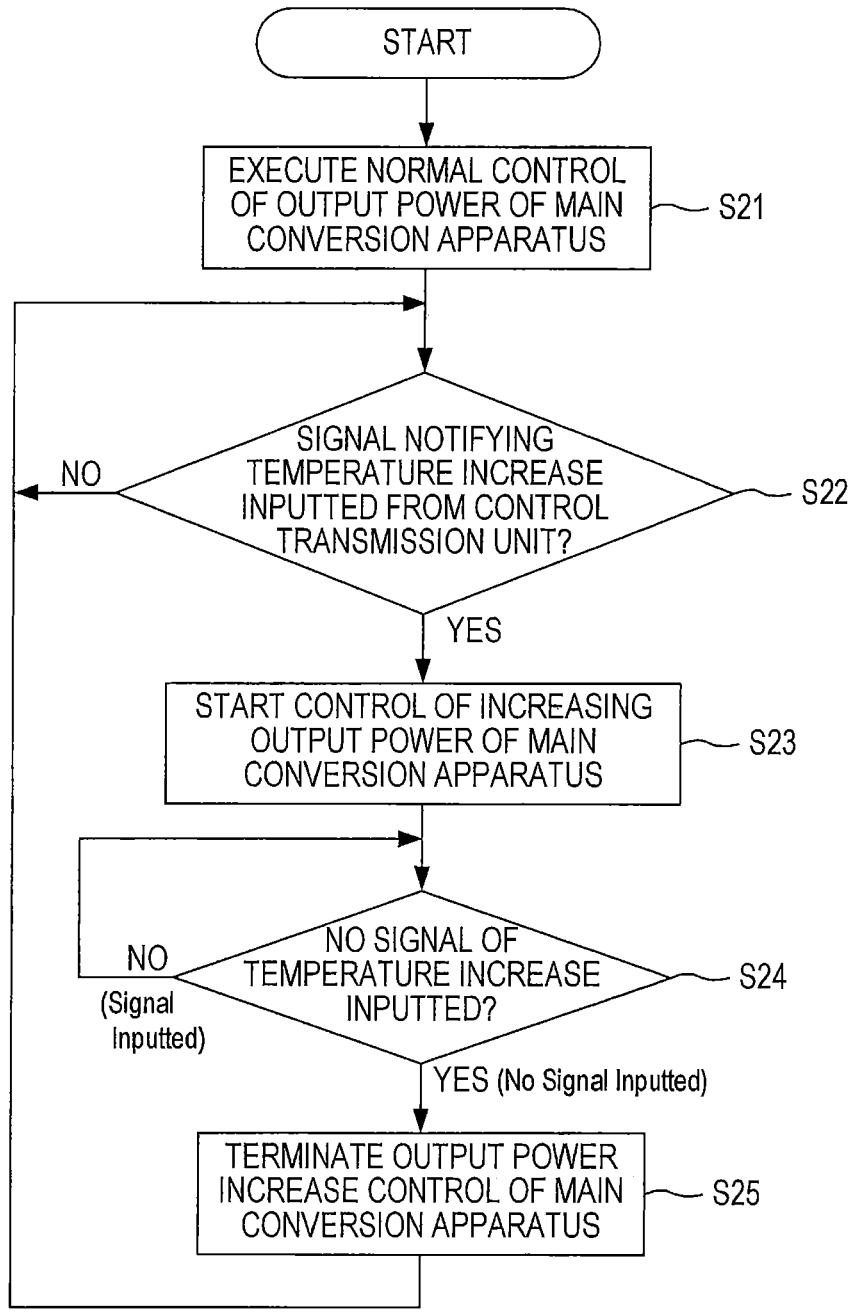
FIG. 9 is a flowchart illustrating a control in a control unit in one main conversion apparatus in a case where another main conversion apparatus has an increased temperature.

A description will be first given of a control by the control unit 115 in the main conversion apparatus 110 of Car No. 7 with reference to a flowchart of FIG. 8. When electric power is inputted to the main conversion apparatus 110, the control unit 115 executes a normal control of the converter unit 11 and the inverter unit 12 (S11). The normal control here means a control to make all of the main conversion apparatuses 110 of the electric train attain an equal output power.

Measurement signals of a temperature of the main conversion apparatus 110, more specifically of temperatures of the converter unit 11 and the inverter unit 12, are constantly inputted to the control unit 115 by the temperature sensors 14. Based on the measurement signals, the control unit 115 executes a determination as to whether the temperature of the main conversion apparatus 110 is equal to or higher than the control start temperature T2 (S12: an example of a determination step). When it is determined that the temperature of the main conversion apparatus 110 is lower than the control start temperature T2, (in case of NO), the control unit 115 executes the aforementioned determination process in S12 again.

Figure 10:
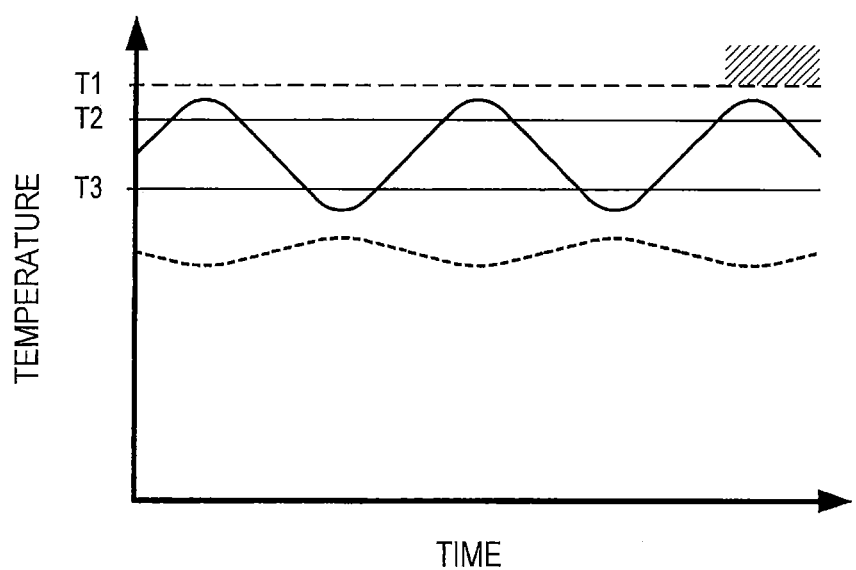
FIG. 10 is a graph illustrating changes in temperature of a main conversion apparatus.

As shown by a solid line graph in FIG. 10, when it is determined that the temperature of the main conversion apparatus 110 is equal to or higher than the control start temperature T2 (in case of YES), the control unit 115 executes a process of outputting a signal to notify the control transmission unit 20 that the temperature of the main conversion apparatus 110 has increased to the control start temperature T2 or higher (S13). Also, the control unit 115 executes a control of suppressing an output power of the main conversion apparatus 110 of Car No. 7 (S14: an example of a control step). Either of an execution timing of the process in S13 or an execution timing of the control in S14 need not precede the other, and both may be executed at the same time.

Figure 11:
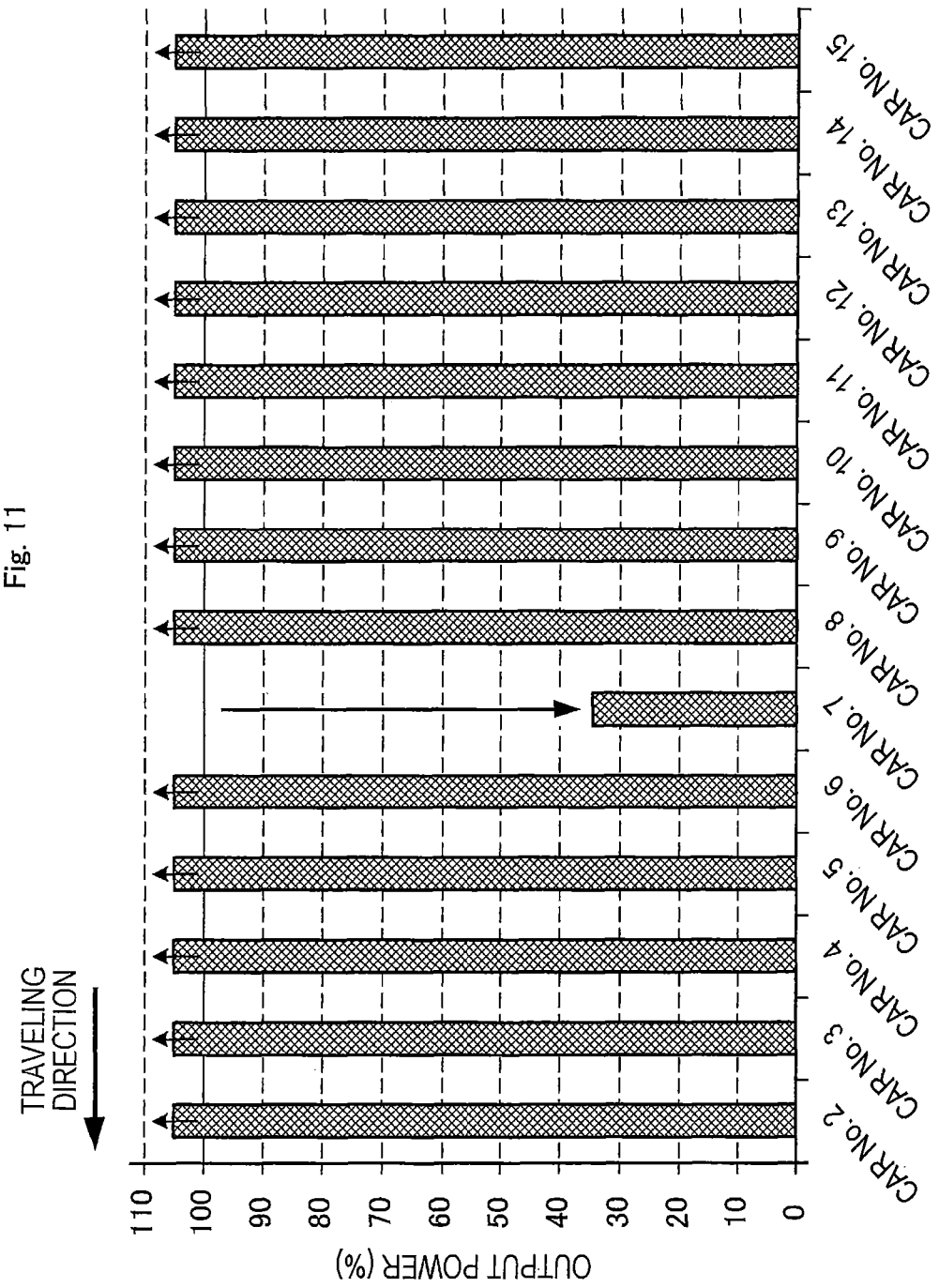
FIG. 11 is a graph illustrating increase/decrease percentages of output powers in main conversion apparatuses.

In the present embodiment, a description will be given of an example in which an output power suppression ratio of the main conversion apparatus 110 in the control in S14 is such that the output power is suppressed to 35% of the output power (an example of a predetermined output power) with reference to an output power (an example of a target output power) of the main conversion apparatus 110 when the normal control is performed under the same conditions as shown in the graph in FIG. 11. The output power suppression ratio is a predetermined value, which is stored in a storage unit (not shown) in the main conversion apparatus 110 or the like. Also, the output power suppression ratio is not limited to the aforementioned 35% but may be set at a different value in accordance with the situation.

When the output power suppression control of the main conversion apparatus 110 is executed, an amount of heat generated in the converter unit 11 and the inverter unit 12 of the main conversion apparatus 110 is reduced, and the temperature of the main conversion apparatus 110 (the converter unit 11 and the inverter unit 12) starts decreasing as shown in FIG. 10.

In such state, the control unit 115 executes a determination as to whether the temperature of the main conversion apparatus 110 has become lower than a control stop temperature (an example of a predetermined termination threshold) T3 (S15). If it is determined that the temperature of the main conversion apparatus 110 is equal to or higher than the control stop temperature T3 (in case of NO), the control unit 115 executes the aforementioned determination process in S15 again.

If it is determined that the temperature of the main conversion apparatus 110 is lower than the control stop temperature T3 (in case of YES), the control unit 115 executes a process of stopping output of a notification signal to the control transmission unit 20 (S16). Further, the control unit 115 executes termination of the control of suppressing the output power of the main conversion apparatus 110 of Car No. 7 (S17). Either of an execution timing of the process in S16 or an execution timing of the control in S17 need not precede the other, and both may be executed at the same time.

When the control of suppressing the output power is terminated, the control unit 115 returns to S12 and executes the aforementioned control repeatedly. The main conversion apparatus 110 of Car No. 7, for which the control of suppressing the output power has been terminated, is subject to the normal control, and the output power of the main conversion apparatus 110 is controlled so as to be the target output power. When the normal control is executed, the amount of heat generated in the converter unit 11 and the inverter unit 12 of the main conversion apparatus 110 of Car No. 7 is increased, and the temperature of the main conversion apparatus 110 starts increasing as shown in FIG. 10.

Next, a description will be given of a control of the control unit 115 in the main conversion apparatus 110 of a car other than Car. No. 7, with reference to a flowchart in FIG. 9. When electric power is inputted to the main conversion apparatus 110, the control unit 115 executes the normal control of the converter unit 11 and the inverter unit 12 (S21).

In the same manner as the control unit 115 of Car No. 7, the control unit 115 executes a determination as to whether the temperature of the main conversion apparatus 110 has become the control start temperature T2 or higher and also executes a determination process as to whether a signal notifying that the temperature has increased to the control start temperature T2 or higher has been inputted from the control unit 115 of any other car through the control transmission unit 20 (S22). If it is determined that a signal notifying such temperature increase has not been inputted (in case of NO), the control unit 115 executes the determination process in S22 again.

If it is determined that a notification signal has been inputted (in case of YES), the control unit 115 executes a control of increasing the output power of the main conversion apparatus 110 of the aforementioned car (S23: an example of a control step). In the present embodiment, a description will be given of an example in which an output power increase ratio of the main conversion apparatus 110 in the control in S23 is such that the output power is increased to 105% with reference to the target output power as shown in the graph in FIG. 11. The output power increase ratio is a predetermined value, similar to the output power suppression ratio, and is stored in advance in a storage unit (not shown). Also, the output power increase ratio is not limited to the aforementioned 105%.

When the output power increase control of the main conversion apparatus 110 is executed, an amount of heat generated in the converter unit 11 and the inverter unit 12 of the main conversion apparatus 110 is increased, and the temperature of the main conversion apparatus 110 starts increasing in response to the temperature decrease of the main conversion apparatus of Car No. 7 as shown by a dotted line in FIG. 10.

In such state, the control unit 115 executes a determination process as to whether no signal of temperature increase has been inputted from the control transmission unit 20 (S24). If it is determined that a signal of temperature increase has been inputted (in case of NO), the control unit 115 executes the aforementioned determination process in S24 again.

If it is determined that no signal of temperature increase has been inputted (in case of YES), the control unit 115 executes termination of the output power increase control of the main conversion apparatus 110 of the current car (S25). When the output power increase control is terminated, the control unit 115 returns to S22, and repeatedly executes the aforementioned control. The main conversion apparatus 110 of the current car after the output power increase control is terminated is subject to the normal control, and the output power of such main conversion apparatus 110 is controlled so as to be the target output power. When the normal control is executed, an amount of heat generated in the converter unit 11 and the inverter unit 12 of the main conversion apparatus 110 is reduced, and the temperature of such main conversion apparatus 110 starts decreasing as shown in FIG. 10.

According of the aforementioned power conversion system 101, in a case where the temperatures in the converter unit 11 and the inverter unit 12 of the main conversion apparatus 110 of, for example, Car No. 7 exceed the control start temperature T2, the control is performed to decrease the output power of the main conversion apparatus 110 of Car No. 7 to thereby reduce thermal load in the power conversion apparatus 110, and also the control is performed to increase the output powers of the main conversion apparatuses 110 of other cars. Thus, down-sizing and weight saving of the main conversion apparatus 110 can be achieved while maintaining the output power of the entire power conversion system 101.

Specifically, as compared with the method of equally controlling output powers of a plurality of power conversion apparatus, a heat dissipation capacity required to the heat dissipation fin unit 13 can be lowered, and thus down-sizing and weight saving of the heat dissipation fin unit 13 can be achieved, and down-sizing and weight saving of the main conversion apparatus 110 can be achieved. Also, as compared with the first embodiment in which the output power increase/decrease ratio of the main conversion apparatus 110 of each of the cars is fixed, it is possible to change the main conversion apparatus 110 whose output power is to be increased/decreased depending on a temperature condition of the main conversion apparatus 110. Thus, it is possible to handle troubles, such as a temperature increase beyond an expected range, in some of the main conversion apparatuses 110.

Further, when the temperature of a main conversion apparatus 110 exceeds the predetermined control start temperature T2, the control of decreasing the output power of such main conversion apparatus 110 to the predetermined power (35% of the target output power in the present embodiment) is executed to thereby facilitate the control by the control unit 115 of such main conversion apparatus 110.

When the temperature of such main conversion apparatus 110 falls below the control stop temperature T3 after the control of decreasing the output power of the main conversion apparatus 110 is started, the control of decreasing the output power of such main conversion apparatus 110 is terminated, and also the control of increasing the output powers of the other main conversion apparatuses 110 is terminated, so that it is possible to limit a time period in which loads in the other main conversion apparatuses 110 are increased. Thus, it is possible to suppress an excessive temperature rise in the other main conversion apparatuses 110.

The technical scope of the present invention should not be limited to the above described embodiments, but various modification may be made within the scope not departing from the subject matter of the present invention.

For example, it may be possible to perform the control of previously specifying the main conversion apparatus to be subject to the output power control as described in the first embodiment, while performing the control of suppressing the output power of the main conversion apparatus whose temperature has increased as described in the second embodiment.

The invention claimed is:

1. A power conversion system for high-speed railway vehicles, comprising:
   a plurality of power conversion apparatuses disposed in line in a traveling direction of a plurality of vehicles coupled to one another to convert externally supplied electric power and to supply the converted power to an electric motor,
   the power conversion apparatuses each comprising:
      a conversion unit to convert the externally supplied electric power;
      a heat dissipation unit disposed on a bottom surface of the vehicle to dissipate heat that is generated in the conversion unit to a traveling wind flowing along the bottom surface; and
      a control unit to control the electric power to be converted in the conversion unit based on a control signal inputted by an operator of the plurality of vehicles,
   wherein a first control unit provided in a first power conversion apparatus of the plurality of power conversion apparatuses executes a control of increasing or decreasing electric power to be converted in a first conversion unit provided in a first power conversion apparatus specified based on the control signal, in accordance with at least one of information of a number of other heat dissipation units disposed forward, in the traveling direction, of a first heat dissipation unit provided in the first power conversion apparatus, and information of a distance to a forwardly adjacent one of the other heat dissipation units in the traveling direction.

2. The power conversion system for high-speed railway vehicles according to claim 1,
   wherein the power conversion apparatus further comprises a measurement unit to measure a temperature of the conversion unit,
   wherein the first control unit decreases the electric power to be converted in the first conversion unit when a measurement signal from the measurement unit indicating that a temperature of the first conversion unit has exceeded a predetermined start threshold is inputted, and
   wherein a second control unit provided in a second power conversion apparatus of the plurality of power conversion apparatuses other than the first power conversion apparatus starts a control of increasing electric power to be converted in a second conversion unit provided in the second power conversion apparatus when the temperature of the first conversion unit has exceeded the predetermined start threshold, to thereby compensate for decreased power in the first conversion unit.

3. A power conversion system for high-speed railway vehicles, comprising:
   a plurality of power conversion apparatuses disposed in line in a traveling direction of a plurality of vehicles coupled to one another to convert externally supplied electric power and supply the converted power to an electric motor, the power conversion apparatuses each comprising:
- a conversion unit to convert the externally supplied electric power;
- a heat dissipation unit disposed on a bottom surface of the vehicle to dissipate heat that is generated in the conversion unit to a traveling wind flowing along the bottom surface;
- a measurement unit to measure a temperature of the conversion unit; and
- a control unit to control electric power to be converted in the conversion unit based on a control signal inputted by an operator of the plurality of vehicles, wherein a first control unit provided in a first power conversion apparatus of the plurality of power conversion apparatuses decreases, when a measurement signal from a first measurement unit indicating that a temperature of a first conversion unit provided in the first power conversion apparatus has exceeded a predetermined start threshold is inputted, electric power to be converted in the first conversion unit, and wherein a second control unit provided in a second power conversion apparatus of the plurality of power conversion apparatus other than the first power conversion apparatus starts a control of increasing electric power to be converted in a second conversion unit provided in the second power conversion apparatus when the temperature of the first conversion unit has exceeded the predetermined start threshold, to thereby compensate for decreased power in the first conversion unit.

4. The power conversion system for high-speed railway vehicles according to claim 2,
wherein the first control unit executes a control of decreasing the electric power to be converted in the first conversion unit to a predetermined electric power when the temperature of the first conversion unit exceeds the predetermined start threshold.

5. The power conversion system for high-speed railway vehicles according to claim 2,
wherein, after the control of decreasing the electric power to be converted in the first conversion unit is started due to the temperature of the first conversion unit exceeding the predetermined start threshold,
when a measurement signal from the first measurement unit indicating that the temperature of the first conversion unit has fallen below a predetermined termination threshold, which is lower than the predetermined start threshold, is inputted to the first control unit, the first control unit terminates the control of decreasing the electric power to be converted in the first conversion unit, and
when the measurement signal from the first measurement unit indicating that the temperature of the first conversion unit has fallen below the predetermined termination threshold is inputted to the second control unit, the second control unit terminates the control of increasing the electric power to be converted in the second conversion unit.

6. A control method of a power conversion system for high-speed railway vehicles including a plurality of power conversion apparatuses disposed in line in a traveling direction of a plurality of vehicles coupled to one another, the power conversion apparatuses each comprising: a conversion unit to convert externally supplied electric power and supply the power to an electric motor; a heat dissipation unit disposed on a bottom surface of the vehicle to dissipate heat that is generated in the conversion unit to a traveling wind flowing along the bottom surface; and a control unit to control the electric power to be converted in the conversion unit based on a control signal inputted by an operator, the method comprising:
- an information defining step of defining, in the control unit provided in a first power conversion apparatus of the plurality of power conversion apparatuses, at least one of information of a number of other heat dissipation units disposed forward, in the traveling direction, of a first heat dissipation unit provided in the first power conversion apparatus, and information of a distance to a forwardly adjacent one of the other heat dissipation units in the traveling direction; and
- a signal defining step of defining a signal to increase or decrease electric power to be converted in a first conversion unit provided in the first power conversion apparatus that is specified based on the control signal, in accordance with the information defined in the information defining step.

7. A control method of a power conversion system for high-speed railway vehicles including a plurality of power conversion apparatuses disposed in line in a traveling direction of a plurality of vehicles coupled to one another, the power conversion apparatuses each comprising: a conversion unit to convert externally supplied electric power and to supply the converted power to an electric motor; a heat dissipation unit disposed on a bottom surface of the vehicle to dissipate heat that is generated in the conversion unit to a traveling wind flowing along the bottom surface; a measurement unit to measure a temperature of the conversion unit; and a control unit to control the electric power to be converted in the conversion unit based on a control signal inputted by an operator, the method comprising:
- a determination step of determining, by a first control unit provided in a first power conversion apparatus of the plurality of power conversion apparatuses, whether a temperature of a first conversion unit provided in the first power conversion apparatus has exceeded a predetermined start threshold; and
- a control step wherein, when it is determined in the determination step that the temperature of the first conversion unit has exceeded the predetermined start threshold, the first control unit starts a control of decreasing electric power to be converted in the first control unit, and outputs a signal notifying that the temperature of the first conversion unit has exceeded the predetermined start threshold to a second control unit provided in a second power conversion apparatus of the plurality of power conversion apparatuses other than the first power conversion apparatus; and the second control unit starts a control of increasing electric power to be converted in a second conversion unit provided in the second power conversion apparatus, to thereby compensate for decreased electric power in the first conversion unit.

8. The power conversion system for high-speed railway vehicles according to claim 3,
wherein the first control unit executes a control of decreasing the electric power to be converted in the first conversion unit to a predetermined electric power when the temperature of the first conversion unit exceeds the predetermined start threshold.

9. The power conversion system for high-speed railway vehicles according to claim 3,
wherein, after the control of decreasing the electric power to be converted in the first conversion unit is started due to the temperature of the first conversion unit exceeding the predetermined start threshold, when a measurement signal from the first measurement unit indicating that the temperature of the first conversion unit has fallen below a predetermined termination threshold, which is lower than the predetermined start threshold, is inputted to the first control unit, the first control unit terminates the control of decreasing the electric power to be converted in the first conversion unit, and when the measurement signal from the first measurement unit indicating that the temperature of the first conversion unit has fallen below the predetermined termination threshold is inputted to the second control unit, the second control unit terminates the control of increasing the electric power to be converted in the second conversion unit.

\* \* \* \* \*